United States Patent [19]

Dorsett et al.

[11] Patent Number: 4,523,259
[45] Date of Patent: Jun. 11, 1985

[54] BOLT-LIGHT BULB COMBINATION

[76] Inventors: Danny R. Dorsett, U.S. Hwy. 6; Gerald D. Smith, Jr., 355 Marian Dr., both of Valparaiso, Ind. 46383

[21] Appl. No.: 565,163

[22] Filed: Dec. 23, 1983

[51] Int. Cl.³ .............................................. B25K 23/18
[52] U.S. Cl. .................................. 362/120; 362/253; 362/806; 411/383
[58] Field of Search ............... 362/100, 119, 120, 253, 362/806; 411/383, 424

[56] References Cited

U.S. PATENT DOCUMENTS

| | | | |
|---|---|---|---|
| 1,342,777 | 6/1920 | Thorne | 362/100 |
| 1,468,415 | 9/1923 | Purnell et al. | 362/253 X |
| 2,414,446 | 1/1947 | Carbone | 362/253 X |
| 2,708,712 | 5/1955 | Jamieson | 362/119 |
| 3,511,982 | 5/1970 | Salter | 362/382 |
| 3,531,634 | 9/1970 | Plouch | 362/253 |
| 3,868,630 | 2/1975 | Lesondak | 362/191 X |
| 4,324,158 | 4/1982 | Le Roy | 362/119 X |
| 4,364,107 | 12/1982 | Wieczorek et al. | 362/285 |
| 4,425,605 | 1/1984 | Cheng | 362/806 X |

FOREIGN PATENT DOCUMENTS

| 310007 | 12/1955 | Switzerland | 362/119 |
|---|---|---|---|
| 1012145 | 12/1965 | United Kingdom | 362/253 |

Primary Examiner—Peter A. Nelson
Attorney, Agent, or Firm—Walter Leuca

[57] ABSTRACT

This invention is an improved bolt containing a light bulb. It comprises a threaded shank having a head at one end. The shank is formed with a longitudinal passageway therethrough. The head of the bolt is also provided with a passageway extending from a side thereof to the longitudinal passageway. A light bulb is inserted in the longitudinal passageway and positioned at the one end thereof to emit light through the passageway provided in the head. Wire leads connecting the light bulb to supply the electric energy thereto extend from the other end of the longitudinal passageway.

11 Claims, 8 Drawing Figures

BOLT-LIGHT BULB COMBINATION

BACKGROUND OF THE INVENTION

1. Field of the Invention

This invention relates generally to fasteners and more particularly to an improved bolt-bulb combination.

2. Description of the Prior Art

Prior art bolts and machine screws are used to connect objects such as plates on a supporting structure. Many of such objects or plates contain devices which must be operated or manipulated, or contain information which are not discernible in the dark. The prior art relating to this invention that we are aware of provide illuminating means in conjuction with fastening devices, however, they are very specialized and therefore are structured to adapt to a specific application.

SUMMARY OF THE INVENTION

This invention is an improved bolt containing a bulb, the light of which is directed in any desired direction such as on information carried by a plate or on a device to be manipulated which is supported in the conventional manner by the bolt of this invention. Accordingly, this invention comprises a threaded shank formed with a longitudinal passageway the length thereof. An aperature is provided transversely of the shank at one end thereof. An aperature is also provided through the head of the bolt either transversely of the threaded shank or coincidental therewith, or both. A miniature bulb is inserted in the passageway of the shank and positioned at the transverse aperature. The light bulb wire leads exit from the other end of the bolt shank. With the exception of its light emitting characteristics, the bolt of this invention appears conventional in outward appearance and functions as a conventional fastener enabling its use for many applications.

These and other objects, features and advantages of the present invention will become more apparent from the following detail description taken in connection with the accompanying drawing which shows, for purposes of illustration only, an embodiment in accordance with the present invention.

A DETAIL DESCRIPTION OF THIS INVENTION

Figure 1:
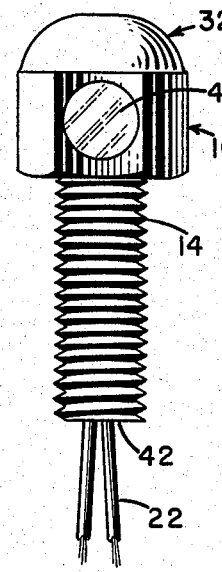
FIG. 1 is a side view of the bolt-bulb combination of this invention.

Referring now more particularly to the drawings wherein a preferred embodiment is illustrated, reference numeral 10 designates generally the combination of this invention. For ease and economy of manufacture we prefer to construct the bolt-bulb combination of this invention by utilizing a commercially available socket type set screw 12 of appropriate size for the threaded shank 14 of this invention. Set screw 12 is converted to the screw shank component 14 of this invention by drilling a passageway 16 longitudinally through set screw 12. This is easily done in one operation by using a drill bit (not shown) embodying 2 diameter sizes. The tool for holding set screw 12, or for holding the drill bit, or both, operates to drill a central longitudinal passageway 16 so that the diametrically enlarged part of the bit follows the diametrically reduced part into one end of set screw 12 a predetermined distance thus providing a shoulder 18 in passageway 16 against which bulb 20 may be seated. Bulb 20 is a conventional miniature bulb well known to the prior art having leads 22 formed integrally therewith and of sufficient length to exit from the other end of passageway 16. Aperature 24 is formed in the sidewall of set screw 12 by drilling a hole 26 through the sidewall adjacent the one end of set screw 12 and slotting the top of the sidewall of set screw 12 as at 28 so that aperature 24 communicates with the enlarged part of passageway 16. Miniature bulb 20 and wire leads 22 are inserted in passageway 16 and positioned therein to be seated on a circumferential constriction such as shoulder 18 so that the incandescent filament of bulb 20 is in the sight of slotted aperature 24. Wire leads 22 of bulb 20 pass through the narrowed part of passageway 16 and exit from the other end of screw 12.

Figures 2, 3, 4, 5, 6:
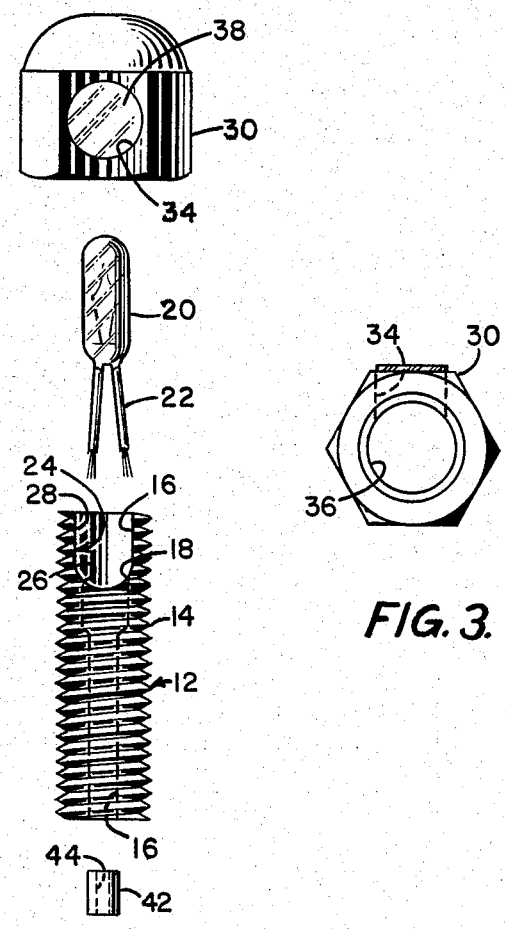
FIG. 2 is a side view of this invention showing the component parts of the bolt-bulb combination in exploded relation.
FIG. 3 is a bottom view of the head component of this invention.
FIG. 4 is a side view of a modified head component of this invention.
FIG. 5 is a bottom view of the modified head component as viewed from the bottom side of FIG. 4.
FIG. 6 is a top view of the modified head component as viewed from the top side of FIG. 4.

Also provided as a component part of this invention to function as the head of bolt 10 is what is commonly referred to as an acorn cap nut or a diamond X cap nut which are also available in commerce. FIGS. 2 through 6 illustrates an acorn nut 30 which is modified to form the head 32 of this invention by drilling a transverse hole 34 in a sideface thereof to communicate with the internally threaded cavity 36 as shown in FIG. 3. A round transparent lens 38 having a diameter equivalent to the diameter of hole 34 is press fitted therein to provide window or light port 40 for bulb 20. Thus modified, nut 30 is threaded onto end of screw shank 14 of this invention until light port 40 of nut 30 is tightened thereon and also aligned with slotted aperature 24 in the end of screw shank 14 to form head 32 of bolt 10 of this invention.

A plug 42, preferably formed from a silicone rubber-like material, is also provided. Plug 42 is formed with a central opening 44 for receiving therethrough wire leads 22 of bulb 20. Plug 42 is press fitted into the other end of passageway 16 and compressingly surrounds leads 22 of bulb 20 which pass therethrough. Plug 42 serves to positionally fix leads 22 and seal the interior of passageway 16 preventing moisture from entering therein. FIGS. 4 through 6 show a similar acorn nut 30 which is modified to provide a dome top light port 46 for bulb 20 by drilling hole 48 in the dome of nut 30 to communicate with passageway 16. Similarly, hole 48 is fitted with a light transparent lens 50 for emitting light from head 32 longitudinally of passageway 16 instead of or in addition to side port 40. The dome light port 46 may be colored for decorative or coding purposes.

Figure 7:
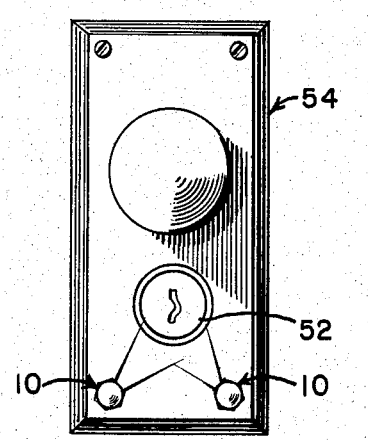
FIG. 7 is a front elevation of a door knob-keyhole plate illuminated by the fastening device of this invention.

FIG. 7 illustrates an application of the fastener combination of this invention showing its utility function of illuminating a keyhole 52 of a door knob plate 54. The electric energy is provided by connecting leads 22 of bulb 20 through the door to the electric doorbell circuit conventionally provided adjacent the door of a dwelling.

Figure 8:
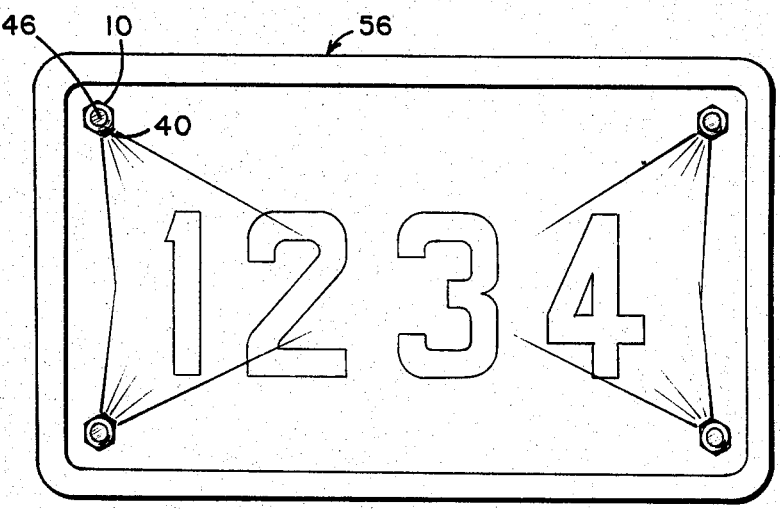
FIG. 8 is a front elevation of a vehicle license plate mounted and illuminated by the fastening device of this invention.

FIG. 8 shows another application of this invention. As shown, the bolt-bulb combination of this invention serves not only to fasten a vehicle license plate 56 in the conventional manner but also, by means of the side window port 40, serves to illuminate the plate numbers and the top dome port 46 provides a decorative illumination.

It is to be understood that though we describe and illustrate a preferred method of forming the bolt-bulb combination of this invention by providing component parts which are commercially available and modifying them as described above, this invention may be practice by modifying a conventional bolt. Such a modified bolt having parts equivalent to the parts illustrated and described, which enables the practice of this invention and which fall within the scope of the claims appended, is intended to be covered. It is understood, of course, that other variations may be made and the improvement still be within the scope of the claimed invention such as having only the top dome port and not the side port in which event the bolt-bulb combination of this invention may be used as decorative fasteners; or shank 14 may be provided with fastening elements other than threads. Also, the circumferential constriction 18 within the longitudinal passageway 16 of shank 14 may be formed by inserting a sleeve of appropriate length into passageway 16.

We claim:

1. A bolt and light bulb combination wherein said bolt comprises a shank having exterior threads and a head at one end of said shank, said threaded shank being the fastening element, and said head being a clamping element, said shank having a passageway longitudinally therethrough terminating in said head, and said head having a passageway through a side thereof transversely of and communicating with said longitudinal passageway in said head;

and wherein said light bulb comprises a body and wire leads, said light bulb body being positioned in said passageways at the intersection of said longitudinal and transverse passageways, and said wire leads of said bulb extending from said longitudinal passageway exterior of the other end of said bolt shank.

2. The combination of claim 1 wherein said bolt is further characterized as having a light-transparent lens fitted in said passageway in said one side of said head.

3. The bolt-bulb combination of claim 1 wherein said bolt is further characterized as having an aperature through the top of said head of said bolt, said aperature extending axially of said longitudinal passageway and communicating therewith.

4. The combination of claim 2 wherein said bolt is further characterized as having a plug in said longitudinal passageway at the other end of said shank, said plug surrounding said wire leads of said bulb closing said longitudinal passageway at said other end thereof and fixing said wire leads relative to said shank.

5. The bolt-bulb combination of claim 3 wherein said head is further characterized as having a light-transparent lens fitted in said aperature in the top of said head.

6. The bolt-bulb combination of claim 5 wherein said aperature and said longitudinal passageway are further characterized as having a shoulder therebetween for seating said light bulb.

7. A bolt for carrying a bulb comprising;
 a set screw member having a passageway longitudinally therethrough and an aperture communicating with said longitudinal passageway adjacent one end thereof, said set screw member being the fastening element of said bolt;
 a cap nut having an internally threaded hole for providing a head for said set screw member, said cap nut having a passageway formed through a side thereof, said passageway in said cap nut extending to and communicating with said internally threaded hole; and
 said cap nut being threaded onto said one end of set screw member and positioned thereon so that said passageway in said cap nut is aligned with said aperture adjacent said one end of said set screw member, said cap being a clamping element of said bolt.

8. A bolt comprising:
 a fastening element, said fastening element being a set screw member having a passageway longitudinally therethrough and an aperture communicating with said longitudinal passageway adjacent one end thereof;
 a clamping element, said clamping element being a cap nut having an internally threaded hole for providing a head for said set screw member, said cap nut having a passageway formed through a side thereof, said passageway in said cap nut extending to and communicating with said internally threaded hole;
 a light emitting bulb in said longitudinal passageway in said screw member; and
 said cap nut being threaded onto said one end of set screw member and positioned thereon so that said passageway in said cap nut is aligned with said aperture adjacent said one end of said set screw member.

9. The bolt of claim 8 wherein said light bulb is further characterized as being positioned in said passageway aligned with said aperture adjacent one end thereof.

10. The bolt of claim 9 wherein said cap nut is further characterized as having a light-transparent lens in said passageway in said side thereof.

11. The bolt of claim 10 wherein said longitudinal passageway is further characterized as having a circumferential constriction to seat said light bulb in said passageway.

* * * * *